United States Patent
Neese et al.

[15] 3,706,319
[45] Dec. 19, 1972

[54] APPARATUS FOR EVACUATING SEPTIC TANKS OR THE LIKE

[72] Inventors: John W. Neese, 1350 E. Benson Hwy., Tucson, Ariz. 85714; James E. Gaylor, 5613 E. Mabel St., Tucson, Ariz. 85712

[22] Filed: Jan. 27, 1971

[21] Appl. No.: 110,016

[52] U.S. Cl. .................................. 137/205, 141/59
[51] Int. Cl. ................................................ B67c 3/16
[58] Field of Search ....... 137/205; 141/59; 15/327 A, 15/353

[56] References Cited

UNITED STATES PATENTS

| | | | |
|---|---|---|---|
| 2,731,103 | 1/1956 | Ortega | 15/353 X |
| 2,233,167 | 2/1941 | Holm | 15/353 |
| 2,832,986 | 5/1958 | Seck | 15/327 A |

*Primary Examiner*—Alan Cohan
*Attorney*—Spencer & Kaye

[57] ABSTRACT

A portable apparatus for evacuating the liquid sewage from holding tanks, septic tanks and the like having a sewage tank which is mounted on a support frame which includes a transport arrangement, e.g., A WHEELED VEHICLE. The sewage tank is provided with a discharge opening, which is normally closed by means of a valve, at the lower end thereof and a sewage inlet at the upper end thereof to which is removably connected a length of flexible hose. A vertically oriented cylindrical housing is mounted on the upper surface of the sewage tank and an electrically powered vacuum or suction pump is removably mounted on the upper end of the housing so that upon actuation of the pump the air in the sewage tank can be withdrawn via the housing. To protect the pump from the sewage and to trap the fumes, a filter is removably mounted in the cylindrical housing. The sewage tank is also provided with a sewage level detecting device, e.g., a float and a switch responsive thereto, for de-energizing the pump when the level of sewage in the tank has reached a predetermined level indicating the tank is essentially full. Preferably, a gasoline engine driven electrical generator is provided on the frame in order to supply power to the pump.

11 Claims, 3 Drawing Figures

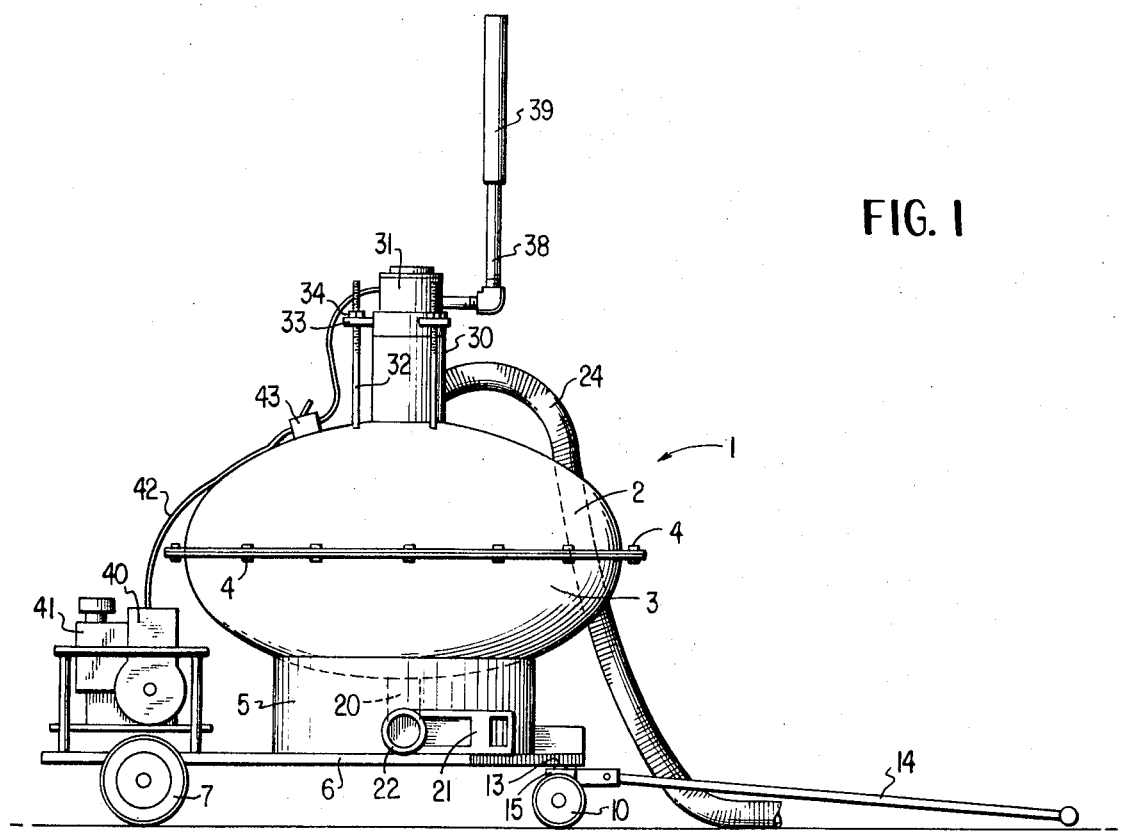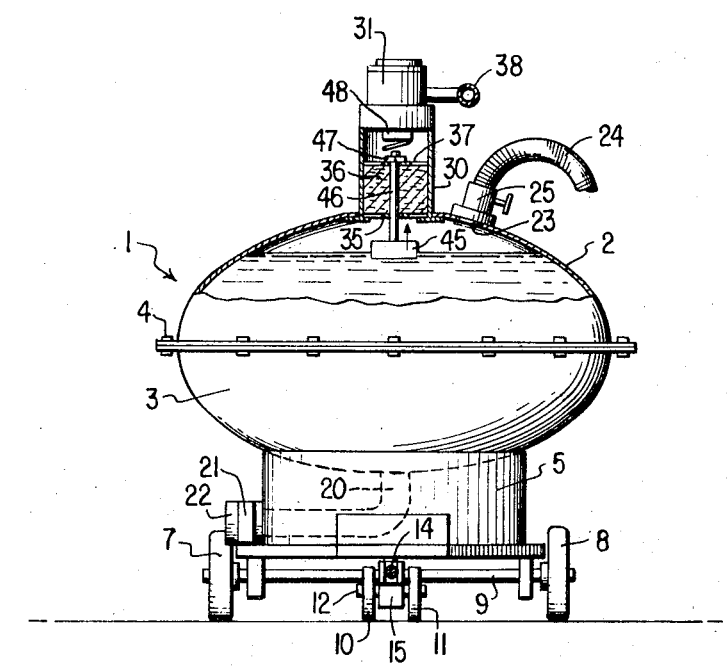

APPARATUS FOR EVACUATING SEPTIC TANKS OR THE LIKE

BACKGROUND OF THE INVENTION

The present invention relates to an apparatus for removing or evacuating sewage from septic tanks or the like. More particularly, the present invention relates to a portable apparatus which depending on the size may be utilized not only to evacuate septic tanks but moreover may be conveniently utilized to evacuate holding tanks of trailers or boats.

Although various devices have been known for the cleaning of septic or holding tanks, such apparatuses are relatively complex and cumbersome, thus in effect rendering them incapable of being easily made portable except when provided in large sizes, for example, on the back of a truck. A need has long existed, however, for a relatively simple apparatus for evacuating the liquid sewage from a holding or septic tank which apparatus will remove the sewage in an efficient and odorless manner and is sufficiently simple so that it may be utilized in units of relatively small size so as to be easily portable.

SUMMARY OF THE INVENTION

It is accordingly, the primary object of the present invention to provide an improved apparatus for evacuating the liquid sewage of a holding or a septic tank. It is a further object of the present invention to provide a new novel and simplified apparatus of the character described which may easily be made portable and, due to its simplicity, may be utilized with apparatus of greatly varied capacity.

It is a further object of the present invention to provide an improved apparatus for evacuating the liquid and other sewage from holding or septic tanks or the like in an efficient and odorless manner by transferring the liquid sewage to a portable sewage tank by means of suction.

It is still a further object of the invention to provide an apparatus for removing the liquid sewage from a septic tank, a holding tank, or the like which automatically ceases the removal of the sewage when the sewage tank of the apparatus is full.

The above and other objects of the invention are achieved according to the present invention in that a sewage tank, for example, of substantially spherical shape, is mounted on a support frame which includes a means for transporting the frame. Preferably the transport means is a wheeled vehicle, for example, a cart or a truck body but alternatively, and for relatively small units, an air cushion may be utilized to enable the apparatus to be moved from one location to another. The sewage tank is provided with a discharge opening and a normally closed discharge valve at its lower end and with a sewage inlet at its upper end to which is connected, preferably by means of a conventional valve which is normally maintained in the opened position, a length of flexible hose which is coupled to the holding or septic tank to be evacuated. Mounted on the upper surface of the sewage tank is a vertically oriented housing having its lower end opening into the interior of the tank. Removably mounted on the upper end of the cylindrical housing is an electrically powered suction producing means, for example, an electric motor driven suction pump or vacuum pump, for withdrawing the air in the sewage tank via the cylindrical housing. An air filter is removably mounted within the cylindrical housing to both trap the sewage odors and to prevent any of the sewage from coming into contact with the motor of the suction producing means.

In order to limit the amount of liquid sewage which may be pumped into the sewage tank of the apparatus, the tank is provided with a liquid level determining apparatus, preferably a float and a microswitch, for disrupting the power to the electric motor of the suction producing means whenever the level of the sewage in the tank has attained a predetermined level.

According to another feature of the invention, the outlet or exhaust air from the suction producing means is vented to the atmosphere via a vertically oriented pipe which preferably has a relatively large telescoping section in order that any offensive fumes or odors not trapped by the filter will be vented to the atmosphere at a height where it will not offend persons in the vicinity of the apparatus.

According to still a further feature of the invention the apparatus is provided with a gasoline engine driven electrical generator which supplies the power for the motor of the suction producing means whereby the unit is self contained. Moreover, the weight of the unit and the need for maintenance thereof is substantially reduced by preferably forming the tank of fiberglass and plastic having the surfaces thereof gel coated so as to provide for relatively little adherence of the sewage to the surfaces thereof.

BRIEF DESCRIPTION OF THE DRAWINGS A

FIG. 1 is a side view of one embodiment of the apparatus according to the invention.

FIG. 2 is a front view, partially in section, of the embodiment of the invention shown in FIG. 1.

DESCRIPTION OF THE PREFERRED EMBODIMENTS

Figure 3:
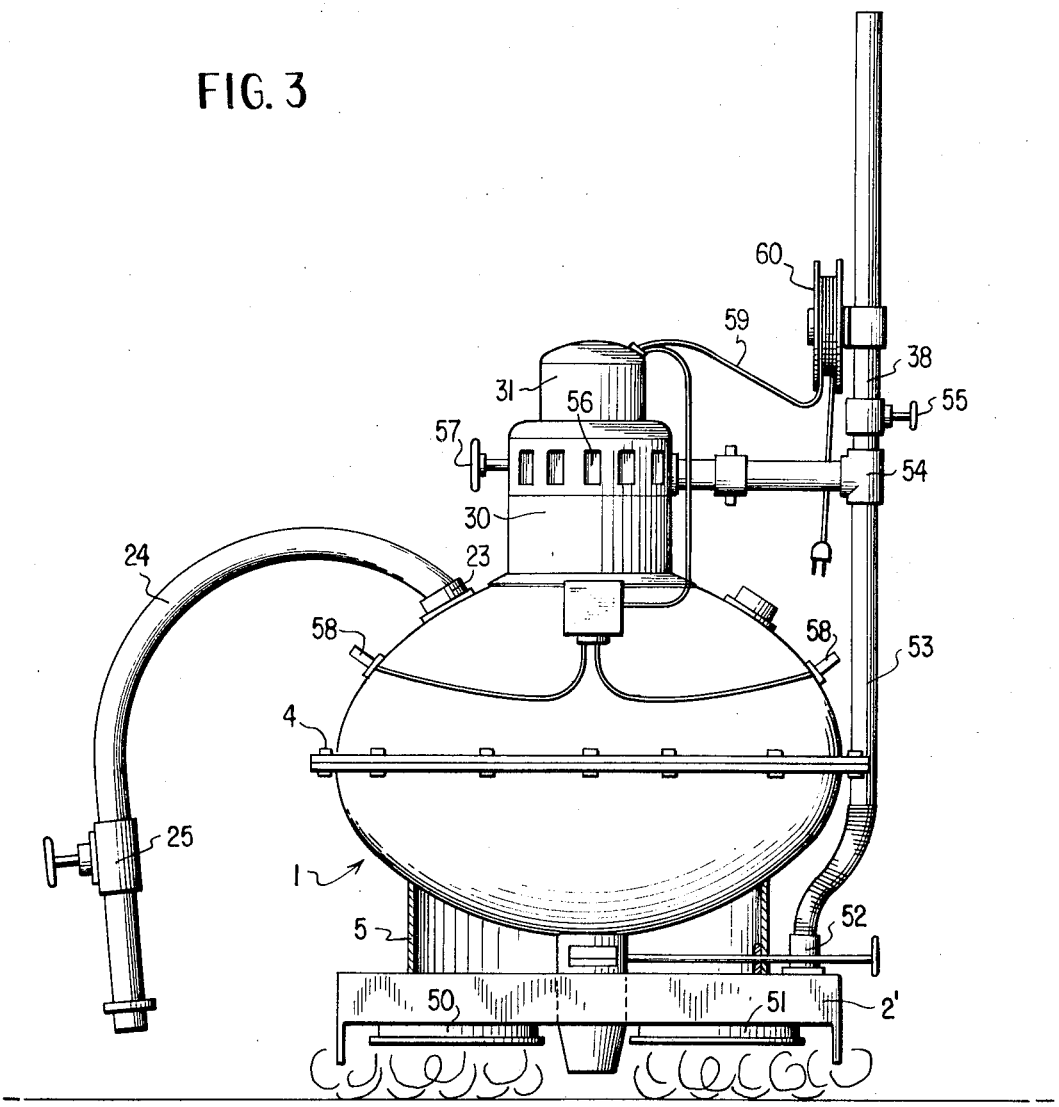
FIG. 3 is a side view of an alternate embodiment of the apparatus according to the invention.

Referring now to FIGS. 1 and 2, there is shown an embodiment of the invention which is particularly suitable for evacuating small holding tanks such as contained in house trailers or boats. As shown in the figures, the apparatus includes a sewage tank 1, which for the intended purpose has a capacity of approximately 70 gallons, and is formed of two substantially identical sections 2 and 3 which are secured together in a sealing manner by means of bolts or rivets 4 about the periphery thereof. Although, as illustrated, the tank 1 is preferably substantially spherical in shape, it is to be understood that the invention is not limited to tanks of this shape and that tanks of any shape and design which will withstand the pressures operating thereon may be utilized. Although the tank 1 may be constructed of metal, according to a feature of the invention, in order to decrease the weight, cost, and maintenance thereof, the tank 1 is preferably constructed of a plastic-fiberglass material with at least the interior surface, and preferably both the interior and exterior surfaces thereof being coated with a gel. Such a gel coating will effectively prevent the sewage to be placed in the tank from adhering to the walls thereof so that the tank can easily be periodically cleaned by merely occasionally flushing the tank with water.

The tank 1 is mounted on a cylindrical hollow support frame 5 which in turn is mounted on a transport arrangement for moving the tank from place to place. In the illustrated embodiment, the transport arrangement comprises a wheeled vehicle consisting of a base 6 having a pair of wheels 7,8 mounted on a stationary axle 9 attached to the rear of the base 6, and a pair of smaller wheels 10, 11 mounted on an axle 12 which is rotatably mounted in the base 6 by means of the journal 13 and a bearing (not shown). In order to pull or push the apparatus from place to place as the case may be, a handle 14 is pivotally connected to the block 15 in which the axle 12 is journalled. It is to be understood that although the illustrated wheeled vehicle is a hand drawn cart that any such wheeled vehicle may be utilized, for example, a truck or the like.

At its lower end, the tank 1 is provided with a downwardly extending discharge conduit 20, which as illustrated, preferably exits from the side of the support frame 5, and is provided with a normally closed manually operated dump or discharge valve 21. The outer end of the discharge conduit 20 is provided with a conventional hose coupling 22 so that a length of flexible hose may be readily attached thereto, if necessary, during the discharge or dumping operation which will occur as a result of gravitational forces when discharge or outlet valve 21 is opened.

The liquid sewage to be collected in the tank 1 enters the tank by means of an inlet opening or coupling 23 formed in the upper surface 2 of the tank 1 at or near the top thereof. Connected to the inlet coupling 23 is one end of a length of flexible hose 24, the other end of which is adapted to be placed in communication with the sewage contents of the septic tank or the like which is to be evacuated. A hose which is particularly suited for this purpose would be formed of a wire reinforced plastic material approximately 3 inches in diameter and in the order of approximately 30 feet in length. Preferably, as illustrated, the inlet coupling 23 is provided with a manually operated valve 25 which is open during normal operation of the apparatus but may be closed whenever the hose 24 is disconnected therefrom in order to prevent the odors from within the tank from escaping.

Mounted on the uppermost portion of the tank 1 is a hollow cylindrical housing 30 whose interior is in direct communication with the interior of the tank 1. Removably mounted on the upper end of the housing 30 is an electrically powered vacuum or suction pump 31 for the purpose of withdrawing the air in the tank 1 via the interior of the housing 30. An electric motor suitable for the pump 31 may, for example, be a 1 horsepower, 115 volt, 12.5 amp motor rotating at 16,200 rpm. The pump 31 may be removably mounted on the housing 31 in any desired manner. For example, such a mounting arrangement may consist of the three vertical studs 32 attached to the surface of the tank 1 which engage openings in corresponding flanges 33 attached to the pump housing and are secured thereto by means of nuts 34, for example, wing nuts.

Supported within the cylindrical housing 30, for example, by means of a perforated or spider-like sheet 35, is a filter element 36 which serves the dual purpose of both preventing any sewage from passing through the housing 30 and reaching the motor of the pump 31, thus decreasing the maintenance requirement thereof, and of trapping the majority of the unpleasant fumes and odors emanating from the sewage in the tank 1 and thus preventing them from escaping into the surrounding atmosphere. To retain the filter in its desired location within the cylindrical housing 30, the upper surface of the filter 36 is also provided with a perforated or spider-like retaining ring 37. Since, however, even with a filter 36 it is possible for some unpleasant fumes or odors to pass into the atmosphere, the exhaust air or outlet line 38 of the suction pump 31 extends in an upward direction so as to vent the unpleasant odors into the atmosphere at a level above the height of persons in the neighborhood of the apparatus. Preferably, as illustrated, the exhaust air line 38 is provided with a telescoping section 39 so that it can extend upwardly for a substantial distance, for example, eight feet.

Although any source of power for the electric motor of the pump 31 may be utilized, in order that the apparatus according to the invention be a self contained unit, an electrical generator 40 which is driven by a gasoline engine 41 are provided and mounted on the base 2 at the rear thereof. Power to the motor of the pump 31 is supplied from the generator 40 by a lead 42 and an on-off switch 43.

In operation, when it is desired to evacuate a holding tank or the like, the unit is transported to the holding tank and the hose 24 is connected between the valve 25 and the holding tank to be evacuated. With the valves 21 and 25 in their closed and opened positions, respectively, the engine 41 is started and the switch 43 is switched to the on position to supply power to the motor of the pump 31. The pump 31 will tend to withdraw the air in the interior of the tank 1 via the housing 30, thus creating suction in the hose 24 to pull the sewage from the connected holding tank through the hose 24 and into the tank 1. In order to prevent overflowing of the tank 1, a sewage level gauge is provided which will de-energize the pump 31 when the level of the sewage in the tank 1 has reached a predetermined value. Although any type of such level gauge may be utilized, preferably as shown in FIG. 2, the level gauge comprises a float 45 to whose upper surface is connected a vertical rod 46. The rod 46 extends through central openings in the plates 35, 37 and the filter 36 so that it is free to travel for a limited vertical distance along the axis of the housing 30. The upper end of the rod 46 is provided with a retaining ring 47 to prevent the float from coming out of its mounting when the tank is empty. Mounted within the housing 30 above and in the travel path of the upper end of the rod 46 is an electrical switch 48, for example, a microswitch, which will be actuated by the rod 46 when the level of the sewage in the tank causes the float to rise. The switch 48 is connected in the power circuit between the generator 40 and the electric motor of the pump 31, and thus actuation thereof will break the power circuit and prevent any further sewage from being drawn into the tank 1. After the tank 1 has been filled, in order to empty same for further use, the unit is merely moved adjacent a sewer opening, the hose 24 connected between the coupling 22 and the sewer line, and the valve 21 opened to cause the sewage in the tank to flow into the sewer line.

Referring now to FIG. 3, there is shown a further embodiment of the unit according to the invention which is generally similar to that shown in FIGS. 1 and 2 but has been modified in a number of its features. In this figure, parts which are the same as that shown in FIGS. 1 and 2 are indicated with the same reference numerals. A most readily apparent modification in the embodiment of FIG. 3 is that instead of a wheeled vehicle for the transporting of the unit, an air cushion on which the base 2' rides is provided. In order to provide the air cushion, the base 2' is provided with an internal chamber forming an air conduit having downwardly directed discharge openings 50 and 51 and an inlet 52. The required air pressure is provided by connecting the inlet 52 via a conduit 53 and a T-joint 54 to the exhaust air line 38 of the pump 31. A manually operated valve 55 is also connected in the upwardly extending portion of the exhaust air line 38. When it is desired to move the unit, and thus provide the desired air cushion, the valve 55 is closed to cause the exhaust air from the pump 31 to be channelled downwardly through the air conduit 53 and out of the openings 50, 51. Although it is possible for the pump 31, during the time that an air cushion is desired, to have its intake connected to the atmosphere via the housing 30, the interior of the tank 1 and the hose 24, such is undesirable particularly if sewage is already present in the tank 1 since any fumes not trapped by the filter will be directed downwardly toward the ground and will be readily noticeable to persons in the area of the unit. Accordingly, preferably the housing of the pump 31 is provided with a plurality of louvers or openings which may be all simultaneously opened or closed by means of a control knob 57 so as to connect the input of the pump 31 directly to the atmosphere when the louvers 56 are open. Once the unit is at its desired location, in order to properly evacuate the sewage from a holding tank or the like, the louvers 56 are closed and the valve 55 is opened.

According to a further modification of the embodiment of FIG. 3, instead of the float for detecting the level of the sewage in the tank, photocells 58 which are electrically connected into the pump motor control circuit by means of wires 59 may be utilized. As also indicated in the figure, in place of a gasoline engine driven generator for supplying the electrical power to the motor of the pump 31, a conventional line cord and plug 59 can be utilized. For convenience in storing the cord 59, a reel 60 mounted on the exhaust pipe 38 is provided. Finally, as indicated in the figure, the discharge conduit 20 and the discharge valve 21 may exit directly beneath the center of the tank 1 rather than on the side thereof as shown in FIGS. 1 and 2 if such is desired.

It will be understood that the above description of the present invention is susceptible to various modifications, changes and adaptations, and the same are intended to be comprehended within the meaning and range of equivalents of the appended claims.

We claim:

1. A portable apparatus for evacuating septic tanks or the like comprising in combination:
   a support frame including means for transporting same;
   a substantially spherically shaped sewage tank for accumulating the sewage to be removed from the septic tank or the like mounted on said frame;
   a vertically oriented cylindrical housing mounted on the upper most portion of the upper surface of said sewage tank, said housing having a diameter which is substantially less than that of said tank and having its lower end in communication with the interior of said sewage tank;
   electrically powered suction producing means removably mounted on the upper end of said cylindrical housing for withdrawing the air in said sewage tank via said cylindrical housing;
   a filter means removably mounted within said cylindrical housing for preventing the sewage from being drawn into said suction producing means and for trapping the odors therefrom;
   inlet means for said sewage tank at the upper end thereof;
   a length of flexible hose having one end connected to said inlet means and its other end adapted to be placed in communication with the interior of the septic tank or the like which is to be evacuated, whereby upon actuation of said suction producing means the suction created thereby will cause the sewage in the septic tank to be evacuated to be drawn via said flexible hose into said sewage tank;
   means mounted within said sewage tank and responsive to the level of the sewage therein for disrupting the electrical power to said suction producing means when a predetermined level of sewage in said sewage tank, which level is below said inlet means, has been attained; and
   an outlet means, including a normally closed outlet valve, for said sewage tank, said outlet means being in communication with the interior of said sewage tank at the lower portion thereof to provide for the gravitational discharge of the contents of said sewage tank when said outlet valve is opened.

2. The apparatus as defined in claim 1 wherein said transport means includes a wheeled vehicle.

3. The apparatus as defined in claim 1 including an upwardly extending exhaust air pipe connected to the outlet side of said suction producing means and opening into the atmosphere.

4. The apparatus as defined in claim 3 wherein said upwardly extending exhaust air pipe is provided with a telescoping extension.

5. The apparatus as defined in claim 3 wherein said transport means comprises means for providing an air cushion beneath the base of said frame for supporting said apparatus, said air cushion means including air conduit means having one end opening into said exhaust air pipe and its other end opening beneath said base, and a valve means connected in said exhaust air pipe for causing the exhaust air from said suction producing means to be directed only through said air conduit means when said valve means is closed in order to provide said air cushion.

6. The apparatus as defined in claim 2 including a gasoline driven electrical generator mounted on said frame for supplying electrical power to said suction providing means.

7. The apparatus as defined in claim 6 wherein said means responsive to the level of the sewage in said sewage tank includes a float member and an electrical switch responsive to the movement of said float member for opening the power circuit between said electrical generator and said suction producing means when said predetermined level of sewage has been attained.

8. The apparatus as defined in claim 7 wherein said float member is provided with an upwardly extending rod which is mounted within said cylindrical housing for vertical travel along the axis thereof and wherein said electrical switch is a microswitch mounted within said cylindrical housing above said rod.

9. The apparatus as defined in claim 7 wherein said sewage tank is formed of plastic and fiberglass and the interior and exterior surfaces thereof are gel coated.

10. The apparatus as defined in claim 8 wherein said filter means has an axial bore, said upwardly extending rod extends through said axial bore, and a retaining means attached to the upper end of said rod for preventing same from passing through said axial bore.

11. A portable suction cleaning apparatus comprising in combination:
- a support frame including means for transporting same;
- a substantially spherically shaped storage tank mounted on said frame for accumulating the material to be removed during the cleaning;
- a vertically oriented cylindrical housing mounted on the upper most portion of the upper surface of said tank, said housing having a diameter which is substantially less than that of said tank and having its lower end in communication with the interior of said tank;
- electrically powered suction producing means removably mounted on the upper end of said cylindrical housing for with-drawing the air in said tank via said cylindrical housing;
- a filter means removably mounted within said cylindrical housing for preventing the material drawn into said tank from being drawn into said suction producing means and for trapping any odors therefrom;
- inlet means for said tank at the upper end thereof;
- a length of flexible hose having one end connected to said inlet means, whereby upon actuation of said suction producing means the suction created thereby will cause the material to be removed by the cleaning action to be drawn via said flexible hose into said tank;
- means mounted within said tank and responsive to the level of the material therein for disrupting the electrical power to said suction producing means when a predetermined level of material in said sewage tank, which level is below said inlet means, has been attained; and
- an outlet means, including a normally closed outlet valve, for said tank, said outlet means being in communication with the interior of said tank at the lowest portion thereof to provide for the gravitational discharge of the contents of said tank when said outlet valve is opened.

* * * * *